(12) United States Patent
Tatebayashi et al.

(10) Patent No.: US 7,503,066 B2
(45) Date of Patent: Mar. 10, 2009

(54) DEACTIVATION SYSTEM

(75) Inventors: Makoto Tatebayashi, Takarazuka (JP); Natsume Matsuzaki, Mino (JP)

(73) Assignee: Panasonic Corporation, Osaka (JP)

( * ) Notice: Subject to any disclaimer, the term of this patent is extended or adjusted under 35 U.S.C. 154(b) by 612 days.

(21) Appl. No.: 10/413,523

(22) Filed: Apr. 15, 2003

(65) Prior Publication Data

US 2004/0019800 A1 Jan. 29, 2004

(30) Foreign Application Priority Data

Apr. 16, 2002 (JP) ............................. 2002-113002

(51) Int. Cl.
*G06F 12/00* (2006.01)
(52) U.S. Cl. .......................... 726/17; 726/20; 713/168; 713/193; 380/247; 380/270
(58) Field of Classification Search ................ 713/168, 713/193; 726/17, 20; 380/247, 270; 340/5.31; 455/411
See application file for complete search history.

(56) References Cited

U.S. PATENT DOCUMENTS

| 5,898,783 | A * | 4/1999 | Rohrbach ................... 340/5.31 |
| 7,174,160 | B2 | 2/2007 | Takae et al. |
| 7,350,084 | B2 | 3/2008 | Abiko et al. |
| 2002/0186845 | A1 * | 12/2002 | Dutta et al. ................... 380/247 |
| 2003/0084281 | A1 | 5/2003 | Abiko et al. |
| 2004/0087337 | A1 | 5/2004 | Takae et al. |
| 2007/0055734 | A1 | 3/2007 | Takae et al. |
| 2007/0135094 | A1 | 6/2007 | Takae et al. |
| 2008/0141044 | A1 | 6/2008 | Abiko et al. |
| 2008/0141045 | A1 | 6/2008 | Abiko et al. |

FOREIGN PATENT DOCUMENTS

| JP | 11-177682 | 7/1999 |
| JP | 11-250201 | 9/1999 |

(Continued)

OTHER PUBLICATIONS

Hank Ishihara, "Secure MultiMediaCard for Content Protection and E-Commerce", ECN Semiconductor Monthly, Dec. 15, 2001, pp. 220326-220327, XP002404297.

(Continued)

*Primary Examiner*—Kimyen Vu
*Assistant Examiner*—Baotran N To
(74) *Attorney, Agent, or Firm*—Wenderoth, Lind & Ponack, L.L.P.

(57) ABSTRACT

A deactivation method is for a system including a communication terminal, a secure device, and a management apparatus. An identification number and communication identification code are notified to the management apparatus while the secure device is attached to the communication terminal. The management apparatus holds the identification number and the communication identification code by correlating them, acquires an identification number of a secure device to be deactivated, when instructed to deactivate the secure device by an authentic owner of a right to use the secure device, extracts the communication identification code in accordance with the identification number, and transmits the deactivation authentication code to an apparatus identified by the extracted communication identification code. If the communication terminal receives the deactivation authentication code while the secure device is attached to it, the secure device is deactivated.

5 Claims, 7 Drawing Sheets

FOREIGN PATENT DOCUMENTS

| | | |
|---|---|---|
| JP | 2000-172914 | 6/2000 |
| JP | 2001-134691 | 5/2001 |
| JP | 2001-184418 | 7/2001 |
| JP | 2001-312702 | 11/2001 |
| JP | 2002-259869 | 9/2002 |

OTHER PUBLICATIONS

Hitachi Corporate Communications Division, "Hitachi Releases PIN Secure MultiMediaCard as Industry's First Flash Card with User Authentication Function", Feb. 25, 2002, pp. 1-3, XP002404298.

* cited by examiner

DEACTIVATION SYSTEM

BACKGROUND OF THE INVENTION (1) Field of the Invention

The present invention relates to a secure device that prevents an unauthorized use of digital contents and an unauthorized act in Electronic Commerce (EC) or Mobile EC.

(2) Description of the Related Art

In recent years, various electronic information services have become widespread. The electronic information services include a contents distribution service and Mobile Electronic Commerce (EC) in which users can receive music contents or moving-picture contents via a network such as the Internet.

In such electronic information services, technologies such as (a) contents protection technology for preventing unauthorized use of contents and (b) EC protection technology such as authentication technology and billing technology for Mobile EC are indispensable. Recently, secure devices providing such technologies have been developed and provided for use.

Users can attach such secure devices to their mobile phones, go outside with mobile phones, and receive the contents distribution service or conduct business transactions in the Mobile EC safely on the road.

In regard to the secure devices, "Secure MultiMedia Card for Contents Distribution/Mobile Commerce" (by Jun Miyake, Harutsugu Ishihara, and Ryuji Tsunehiro, Hitachi Hyoron, October 2001 issue) discloses a Secure MultiMedia Card (SMMC) that includes both contents protection technology and EC protection technology.

The secure devices have functions which are effective in EC and are equivalent to the user's signature or a registered personal seal in ordinary commerce. The secure devices also store, for example, (i) information that the user wants no one to know and (ii) a secret key which is used to decrypt an encrypted electronic mail.

Accordingly, if the user loses the secure device or has it stolen, there is a fear that a malicious third party may use the secure device without the user's authorization to cause economic damage to the user, or might get to know information that the user wants no one to know.

Under such circumstances, secure devices having functions to prevent a third party from using a secure device without authorization have come on the market. For example, such a secure device has a function to authenticate the user by biological information like fingerprints, or by a password.

For example, Japanese Patent Publication No. 3-65589 discloses a method that compares secret data such as a password input from the outside with data having been stored inside, and permits the secure device to be used only if the two pieces of data match.

In the above method, however, the user is required to memorize the secret data as a "pass phrase" to input it into the secure device. For the pass phrase, users often select a numeral sequence or the like that can be memorized easily. This makes it easy for a third party to guess the pass phrase.

Also, when biological information such as a fingerprint is used, an apparatus for reading the biological information is required. This would increase the cost.

It is therefore desirable to deactivate secure devices if they are lost or stolen.

Japanese Patent Publication No. 4-44314 discloses a personal mobile card that has a memory for storing the use history of the user and prohibits the use of its functions if a certain operation fails a certain number of times.

Also, Japanese Laid-Open Patent Application No. 11-177682 discloses a method in which deactivation data and an identification code of a user such as a user's telephone number are stored beforehand in an IC card that is to be inserted into a wireless communication device such as a mobile phone, and if the user loses the IC card, the user transmits the deactivation data from another telephone terminal to the IC card, namely to a communication terminal in which the IC card is inserted, using the identification code (telephone number) as the destination. Upon receiving the deactivation data, the IC card compares the received deactivation data with the deactivation data having been stored inside beforehand and prohibits the functions of the card from being used if the two pieces of deactivation data match.

In the above method, however, it is presumed that the IC card is a SIM (Subscribe Identification Module) that is provided only to a subscriber of a telephone system and communication is possible only when an identification code, which is issued by a communication provider and unique to the subscriber, is used as the destination. With this method, however, the usage of the IC card is limited to a pattern in which only the identification code is used as the communication destination, when the communications should be made with high-level security.

From the standpoint of users, however, it is not desirable that the secure device be limited to a usage pattern in which only an identification code issued by a particular communication provider is used. It is desirable, for example, that a user can conduct business transactions in EC by inserting a secure device into a mobile phone on one occasion, can encrypt electronic mail by inserting the same secure device into an Internet terminal on another occasion, and can deactivate the secure device regardless of the usage pattern or the communication terminal into which the secure device is inserted.

SUMMARY OF THE INVENTION

The object of the present invention is therefore to provide a deactivation method, system, and program that is not limited to a usage pattern in which only an identification code issued by a particular communication provider is used, and can deactivate a secure device regardless of the usage pattern or the communication terminal into which the secure device is inserted.

The above object is fulfilled by a deactivation method for a system including a communication terminal, a secure device, and a management apparatus, the communication terminal stores a communication identification code assigned thereto and is operable to communicate with other apparatuses based on the communication identification code. The secure device stores an identification number assigned thereto and is used while being attached to the communication terminal. The management apparatus stores a deactivation authentication code authenticating an instruction to deactivate the secure device, and is operable to manage deactivation of the secure device. The deactivation method comprises: a notification step in which the identification number and the communication identification code are notified to the management apparatus while the secure device is attached to the communication terminal, a holding step in which the management apparatus holds the identification number and the communication identification code notified in the notification step by correlating the identification number with the communication identification code, an acquisition step in which the management apparatus acquires an identification number of a secure device to be deactivated when instructed to deactivate the secure device by an authentic owner of a right to use the secure device, a deactivation instructing step in which the management apparatus extracts, in accordance with the identification number received in the reception step, the communication identification code that was held in the holding step, and transmits the deactivation authentication code to an apparatus identified by the extracted communication identification code, and a deactivation step in which, if the communication terminal receives the deactivation authentication code transmitted in the deactivation instructing step while the secure device is attached to the communication terminal, the secure device is deactivated.

The above object is also fulfilled by a deactivation system comprising a communication terminal operable to communicate with other apparatuses, a secure device being used while being attached to the communication terminal, and a management apparatus operable to manage deactivation of the secure device. The secure device includes an identification number storage unit operable to store an identification number assigned to the secure device, an identification number notifying unit operable to notify the management apparatus of the identification number via the communication terminal while the secure device is attached to the communication terminal and a deactivation unit operable to, if a deactivation instruction instructing to deactivate the secure device is received from the communication terminal while the secure device is attached to the communication terminal, deactivate the secure device. The communication terminal includes a communication identification code storage unit operable to store a communication identification code assigned to the communication terminal, a communication identification code notifying unit operable to notify the management apparatus of the communication identification code while the secure device is attached to the communication terminal, and a deactivation authentication code receiving unit operable to send the deactivation instruction to the secure device only after a deactivation authentication code which authenticates the deactivation instruction is received from the management apparatus while the secure device is attached to the communication terminal. The management apparatus includes a deactivation authentication code storage unit operable to store the deactivation authentication code, a holding unit operable to hold (i) the identification number notified from the identification number notifying unit and (ii) the communication identification code notified from the communication identification code notifying unit by correlating the identification number with the communication identification code, an acquisition unit operable to acquire an identification number of a secure device to be deactivated when instructed to deactivate the secure device by an authentic owner of a right to use the secure device, and a deactivation authentication code transmission unit operable to extract, in accordance with the identification number received by the reception unit the communication identification code that is held by the holding unit, and transmit the deactivation authentication code to an apparatus identified by the extracted communication identification code.

The above object is also fulfilled by a secure device being used while being attached to a communication terminal that stores beforehand a communication identification code assigned thereto and is operable to communicate with other apparatuses based on the communication identification code. The secure device comprises a storage unit operable to store an identification number assigned to the secure device, a notifying unit operable to notify a management apparatus of the identification number via the communication terminal while the secure device is attached to the communication terminal and a deactivation unit operable to, if a deactivation instruction is received via the communication terminal while the secure device is attached to the communication terminal, deactivate the secure device. The deactivation instruction instructs to deactivate the secure device and is transmitted from the management apparatus to the communication terminal based on the communication identification code.

The above object is also fulfilled by a communication terminal which uses a secure device is attached thereto, the secure device storing an identification number assigned to the secure device. The communication terminal comprises a storage unit operable to store a communication identification code assigned to the communication terminal, a notifying unit operable to notify a management apparatus of the identification number and the communication identification code while the secure device is attached to the communication terminal, and a deactivation unit operable to deactivate the secure device if an instruction to deactivate the secure device is received from the management apparatus while the secure device is attached to the communication terminal. The deactivation instruction is transmitted to the communication terminal based on the communication identification code.

The above object is also fulfilled by a management apparatus that manages deactivation of a secure device which is used while being attached to a communication terminal. The management apparatus comprises a deactivation authentication code storage unit operable to store a deactivation authentication code authenticating an instruction to deactivate the secure device. A communication identification code holding unit is operable to receive, from the communication terminal while the secure device is attached to the communication terminal, and hold (i) an identification number assigned to the secure device and (ii) a communication identification code assigned to the communication terminal, by correlating the identification number with the communication identification code. An acquisition unit is operable to acquire an identification number of a secure device to be deactivated when instructed to deactivate the secure device by an authentic owner of a right to use the secure device, and a deactivation authentication code transmission unit is operable to extract, in accordance with the identification number received by the reception unit, the communication identification code that is held by the holding unit and transmit the deactivation authentication code to an apparatus identified by the extracted communication identification code.

The above object is also fulfilled by a communication program for a communication terminal which uses a secure device attached thereto, and the secure device storing an identification number assigned to the secure device, the communication terminal storing a communication identification code assigned to the communication terminal. The communication program comprises a notifying step for notifying a management apparatus of the identification number and the communication identification code while the secure device is attached to the communication terminal and a deactivation step for deactivating the secure device if an instruction to deactivate the secure device is received from the management apparatus while the secure device is attached to the communication terminal. The deactivation instruction is transmitted to the communication terminal based on the communication identification code.

The above object is also fulfilled by a management program for a management apparatus that manages deactivation of a secure device which is used while being attached to a communication terminal, the management apparatus storing a deactivation authentication code authenticating an instruction to deactivate the secure device. The management program comprises a communication identification code holding step for receiving, from the communication terminal while the secure device is attached to the communication terminal, and holding (i) an identification number assigned to the secure device and (ii) a communication identification code assigned to the communication terminal, by correlating the identification number with the communication identification code, an acquisition step in which the management apparatus acquires an identification number of a secure device to be deactivated when instructed to deactivate the secure device by an authentic owner of a right to use the secure device and a deactivation authentication code transmission step for extracting, in accordance with the identification number received in the reception unit, the communication identification code that was held in the holding step, and transmitting the deactivation authentication code to an apparatus identified by the extracted communication identification code.

With the above-described construction, when the user loses the secure device while it is attached to the secure device, it is possible to deactivate the communication terminal by transmitting, for example, the deactivation authentication code as the deactivation instruction, to the communication identification code of the communication terminal that is held by the management apparatus. Also, if the lost secure device is attached to another communication terminal, the communication identification code of the other communication terminal is sent to the management apparatus. As a result, it is possible to deactivate the lost secure device with reliability.

Accordingly, the secure device is not limited to a usage pattern in which only an identification code issued by a particular communication provider is used, and the secure device can be deactivated regardless of the usage pattern or the communication terminal into which the secure device is inserted.

Also, since the deactivation instruction is transmitted from the management center, an authentication protocol can be executed using a high-level encryption algorithm. This enhances safety as compared with a conventional deactivation method in which a password that relies on the user's memory is used in the authentication.

In the above secure device, the storage unit may further store history information of communication identification codes for each communication terminal to which the secure device was attached at least once.

With the above-described construction, if the lost secure device is found, a communication terminal to which the lost secure card was attached while it was lost is identified, and it becomes a clue for identifying the owner of the communication terminal.

In the above secure device, the storage unit may further store an electronic mail address of the management apparatus. The communication identification code of the communication terminal is an electronic mail address. The notifying unit causes the communication terminal, to which the secure device is attached, to transmit an electronic mail containing the identification number and the communication identification code to the electronic mail address of the management apparatus stored in the storage unit. The deactivation unit receives the deactivation instruction from the communication terminal, the deactivation instruction being sent from the communication terminal based on an electronic mail that contains the deactivation instruction and is sent to the electronic mail address of the communication terminal.

With the above-described construction, even if direct communications between communication terminals are impossible because, for example, a communication terminal has been powered off, information can be sent by electronic mail.

The above secure device may further comprise an activation unit operable to, after the deactivation unit has deactivated the secure device, if an activation instruction is received via the communication terminal, activate the secure device. The activation instruction instructs to activate the secure device and is transmitted from the management apparatus to the communication terminal based on the communication identification code.

With the above-described construction, when the user finds the secure device after deactivating the secure device, it is possible to activate the secure device by transmitting, for example, the activation authentication code as the activation instruction, to the communication identification code of the communication terminal that is held by the management apparatus. Also, if the secure device is attached to another communication terminal, the communication identification code of the other communication terminal is sent to the management apparatus, enabling the secure device to be activated.

The above secure device may further comprise a conditional use unit operable to permit the secure device to be used offline within a predetermined limit and a condition change unit operable to change online the limit dealt with by the conditional use unit.

With the above-described construction, the secure device can be used off line within the predetermined limit, and it is possible to update or change the limit online. This provide both safety and convenience.

In the above secure device, the deactivation unit may deactivate the secure device only after a challenge-response authentication performed with the communication terminal terminates successfully.

With the above-described construction, it is possible to deactivate the secure device only if the deactivation instruction or the communication terminal is authentic.

The above communication terminal may further comprise a connection detecting unit operable to detect that the secure device has been attached to the communication terminal. The secure device further stores a communication identification code of a communication terminal to which the secure device was attached most recently. The notifying unit includes a communication identification code acquiring unit operable to, if the connection detecting unit detects that the secure device has been attached to the communication terminal, acquire from the secure device the communication identification code of the communication terminal to which the secure device was attached most recently, a comparison unit operable to compare the communication identification code acquired by the communication identification code acquiring unit with the communication identification code stored in the storage unit and judge whether the two communication identification codes match and an update unit operable to inhibit the notification from being executed if the comparison unit judges that the two communication identification codes match, and operable to, if the comparison unit judges that the two communication identification codes do not match, execute the notification and update the communication identification code, stored in the secure device, of the communication terminal to which the secure device was attached most recently, by replacing the communication identification code with the communication identification code stored in the storage unit.

With the above-described construction, the notification is not performed unless the secure device is attached to the same communication terminal as before. This eliminates useless communications, and reduces the burden on the management apparatus.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENT

Embodiment

Construction

Figure 1:
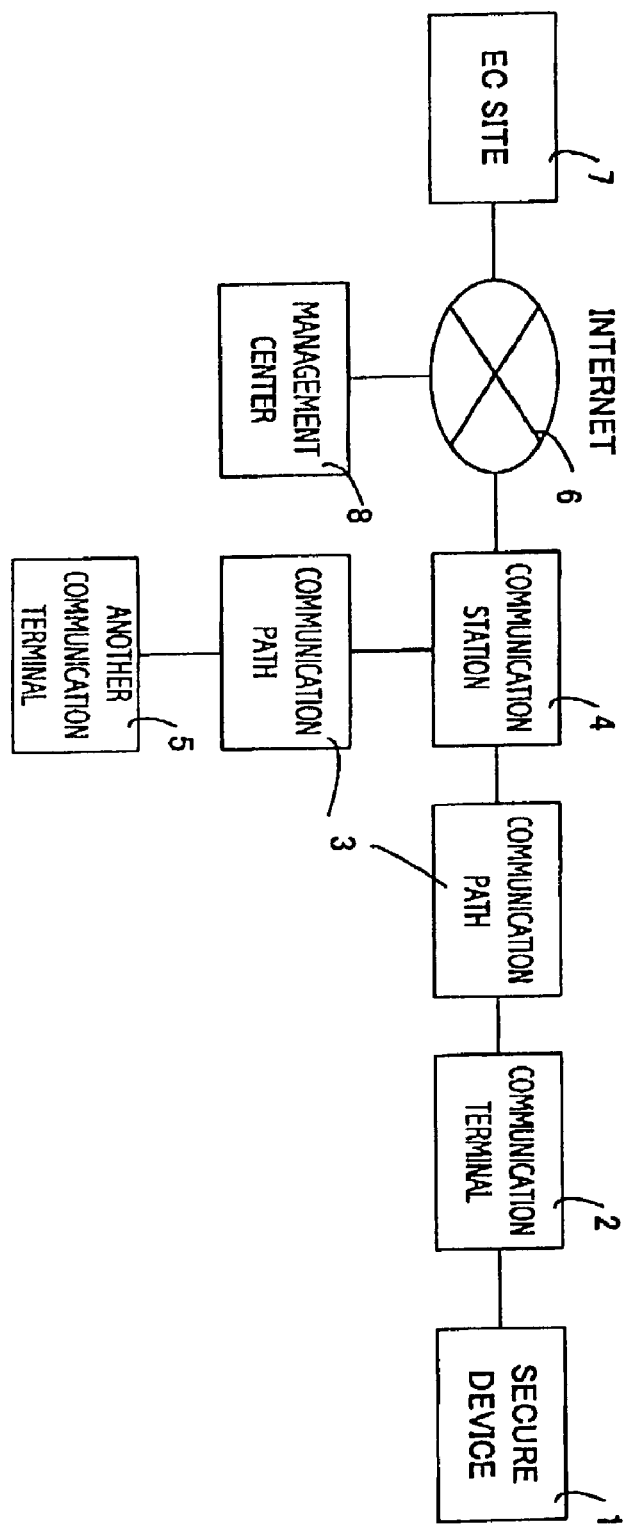
FIG. 1 shows the construction of a deactivation system in a preferred embodiment of the present invention.

FIG. 1 shows the construction of a deactivation system in a preferred embodiment of the present invention.

As shown in FIG. 1, the deactivation system in the present embodiment includes a secure device 1, a communication terminal 2, communication paths 3, a communication station 4, a communication terminal 5, an Internet 6, an EC site 7, and a management center 8.

The secure device 1 is, for example, a secure multimedia card such as JAVA Card, and is used while it is inserted in any communication terminal such as a mobile phone or an Internet terminal by the user.

The appearance of the secure device 1, for example, resembles a postage stamp in size as is the case with a conventional SMMC. The secure device 1 may have a size of a conventional IC card or may be in a different shape.

The communication terminal 2 is, for example, a mobile phone or an Internet terminal, and can communicate with another apparatus via the communication paths 3.

The communication paths 3 are part of a communication network owned by a communication provider who also owns the communication station 4.

The communication station 4 provides the communication terminals 2 and 5 with a communication service.

The Internet 6 is a communication network used to connect to an external apparatus.

The EC site 7 is connected to the Internet and provides the user with an EC service.

The management center 8 transmits an electronic mail for deactivating the secure device 1 inserted in the communication terminal 2 in response to a request from an authentic owner of the right to use the secure device 1.

The user inserts the secure device 1 into the communication terminal 2, communicates with the communication station 4, accesses the EC site 7 via the communication station 4, and conducts, for example, EC transactions using a credit card banking system or the like.

Figure 2:
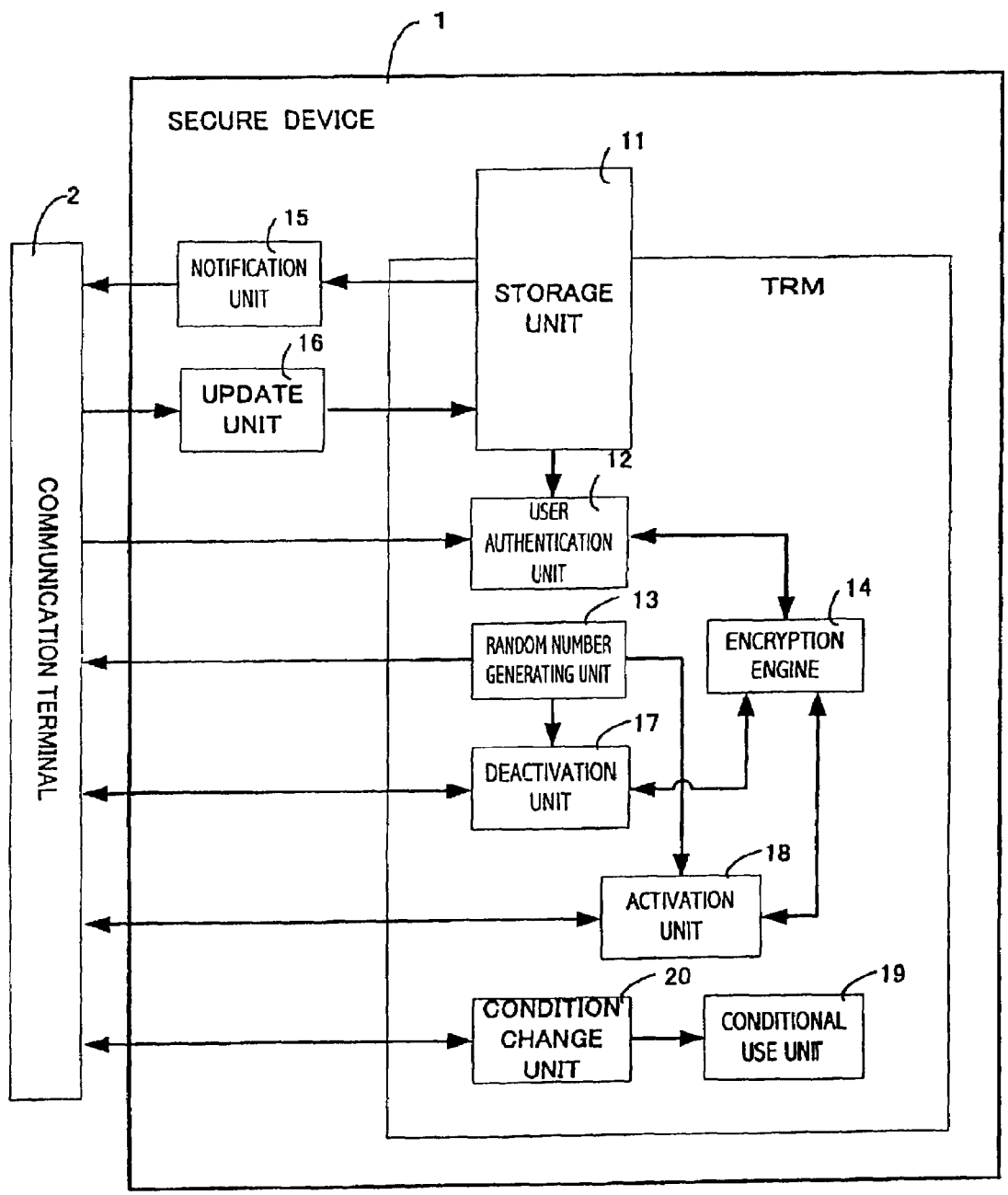
FIG. 2 shows the construction of a secure device 1.

FIG. 2 shows the construction of the secure device 1.

As shown in FIG. 2, the secure device 1 includes a storage unit 11, a user authentication unit 12, a random number generating unit 13, an encryption engine 14, a notification unit 15, an update unit 16, a deactivation unit 17, an activation unit 18, a conditional use unit 19, and a-condition change unit 20.

The storage unit 11 includes a PROM and a RAM that are also included in a TRM (Tamper-Resistant Module) and a large-capacity flash memory (for example, having a capacity of 8 to 256 MB) that is not included in the TRM. The PROM is a memory onto which data can be written only once, namely when it is initialized. The PROM includes two areas in which data is written: a readable area from which the data can be read to the outside; and a not-readable area from which the data cannot be read to the outside. The readable area stores: an identification number for identifying a secure device, each identification number being different and unique to a secure device; and an electronic mail address as a communication identification code of the management center. The not-readable area stores a decryption key used for encryption communications; a signature key used in making a digital signature; a user authentication key used in authenticating the user; a deactivation authentication key used in authenticating an instruction to deactivate the secure device; an activation authentication key used in authenticating an instruction to activate the secure device; and a recorded password used in authenticating the user. The RAM stores general information or information valuable to the user, such as information concerning a ticket the user has bought or the user's private information. The RAM also stores (i) communication identification codes of communication terminals into which the secure device was inserted and (ii) an electronic mail address that is a communication identification code of a communication terminal into which the secure device was inserted most recently. The flash memory stores general information or information less valuable to the user.

The TRM is a module having a mechanism that prevents an unauthorized reference of or tampering of the data recorded therein. The storage unit 11 stores only values "0" (zero) as the initial values of the electronic mail address, and has these values when the secure device has not been inserted in any communication terminal.

In the present embodiment, the identification number of the secure device 1 is represented as "SDID", the electronic mail address of a communication terminal into which the secure device was inserted most recently is represented as "SD_MLADR", and the electronic mail address of the management center 8 is represented as "CMLADR".

In more specific examples, the electronic mail address of the management center 8 is 'HYPERLINK"mailto:center@xxxjp"' and the electronic mail address of the communication terminal 2 is 'HYPERLINK "mailto:abcd@xxxjp"'.

The user authentication unit 12, deposited in the TRM, compares an input password input by the user with the recorded password which is stored in the initialization into the storage unit 11, and if they match, activates other components of the TRM to allow the secure device 1 to be used, and if they do not match, inactivates other components of the TRM to inhibit the secure device 1 from being used.

The random number generating unit 13, deposited in the TRM, generates a 64-bit random number in accordance with a request from a communication terminal in which the secure device 1 is inserted and passes the generated random number to the communication terminal.

The encryption engine 14, deposited in the TRM, is a module that performs encryption, decryption, signature creation, and signature verification. The encryption engine 14 encrypts and decrypts data for EC and private electronic mails, and creates and verifies a digital signature for EC. It is presumed in the present embodiment that the common key encryption conforms to DES (Data Encryption Standard), the public key encryption conforms to RSA (Rivest Shamir Adleman) encryption, and the digital signature conforms to RSA signature. These technologies are described in "Modern Encryption Theory" by Ikeno and Koyama, Electronics and Communications in Japan, 1985.

The notification unit 15 notifies the communication terminal, in which the secure device 1 is inserted, of the identification number stored in the storage unit 11, and causes the communication terminal to notify the management center 8 of the identification number together with the communication identification code of the communication terminal.

The update unit 16, upon receiving, from the communication terminal into which the secure device 1 is currently inserted, an update instruction to update the communication identification code of the communication terminal into which the secure device 1 was inserted most recently, where the communication identification code is stored in the storage unit 11, stores the communication identification code of the communication terminal into which the secure device 1 is currently inserted as the communication identification code of the communication terminal into which the secure device 1 was inserted most recently.

The deactivation unit 17, upon receiving from the communication terminal 2 an instruction to deactivate the secure device 1, authenticates the deactivation instruction through a challenge-response process using the random number generating unit 13 and the encryption engine 14. When having successfully authenticated the deactivation instruction, the deactivation unit 17 deactivates the secure device 1, transmits a signal to the communication terminal 2 to convey the deactivation success, and when having failed to authenticate the deactivation instruction, the deactivation unit 17 transmits a signal to the communication terminal 2 to convey that the deactivation failed.

It should be noted here that the deactivation of a secure device indicates that main functions of the secure device are stopped and the data stored in the secure device is prohibited from being read to the outside. It should also be noted that if an activation instruction is received after that, the deactivated state can be cancelled.

If it is desired that the function to cancel the deactivated state be nullified, the functions of the secure device may be destroyed and the data stored in the secure device maybe erased.

The activation unit, upon receiving from the communication terminal 2 an instruction to activate the secure device 1, authenticates the activation instruction through a challenge-response process using the random number generating unit 13 and the encryption engine 14. When having successfully authenticated the activation instruction, the activation unit 18 activates the secure device 1, transmits a signal to the communication terminal 2 to convey the activation success, and when having failed to authenticate the activation instruction, the activation unit 18 transmits a signal to the communication terminal 2 to convey that the activation failed.

It should be noted here that the activation of a secure device indicates that the deactivated state of the secure device, which has been caused by deactivation, is cancelled.

The conditional use unit 19 permits the user to use the secure device offline within a certain limit. The certain limit may be, for example, a certain amount of money that the user can expend in EC. If, for example, the limit is set to 5,000 yen, the conditional use unit 19 holds "5,000" as an initial value of offline balance data, then subtracts each amount of money expended offline from the offline balance data, prohibiting offline the user from expending an amount of money exceeding the offline balance data.

The condition change unit 20, online, resets the offline balance data to the initial value or changes the limit dealt with by the conditional use unit 19 only when the management center 8 can deactivate the limit. For example, when the limit is set to 5,000 yen and the offline balance data is currently "1,000", the condition change unit 20 online resets the offline balance data to the initial value "5,000" or sets the limit to 10,000 yen.

Figure 3:
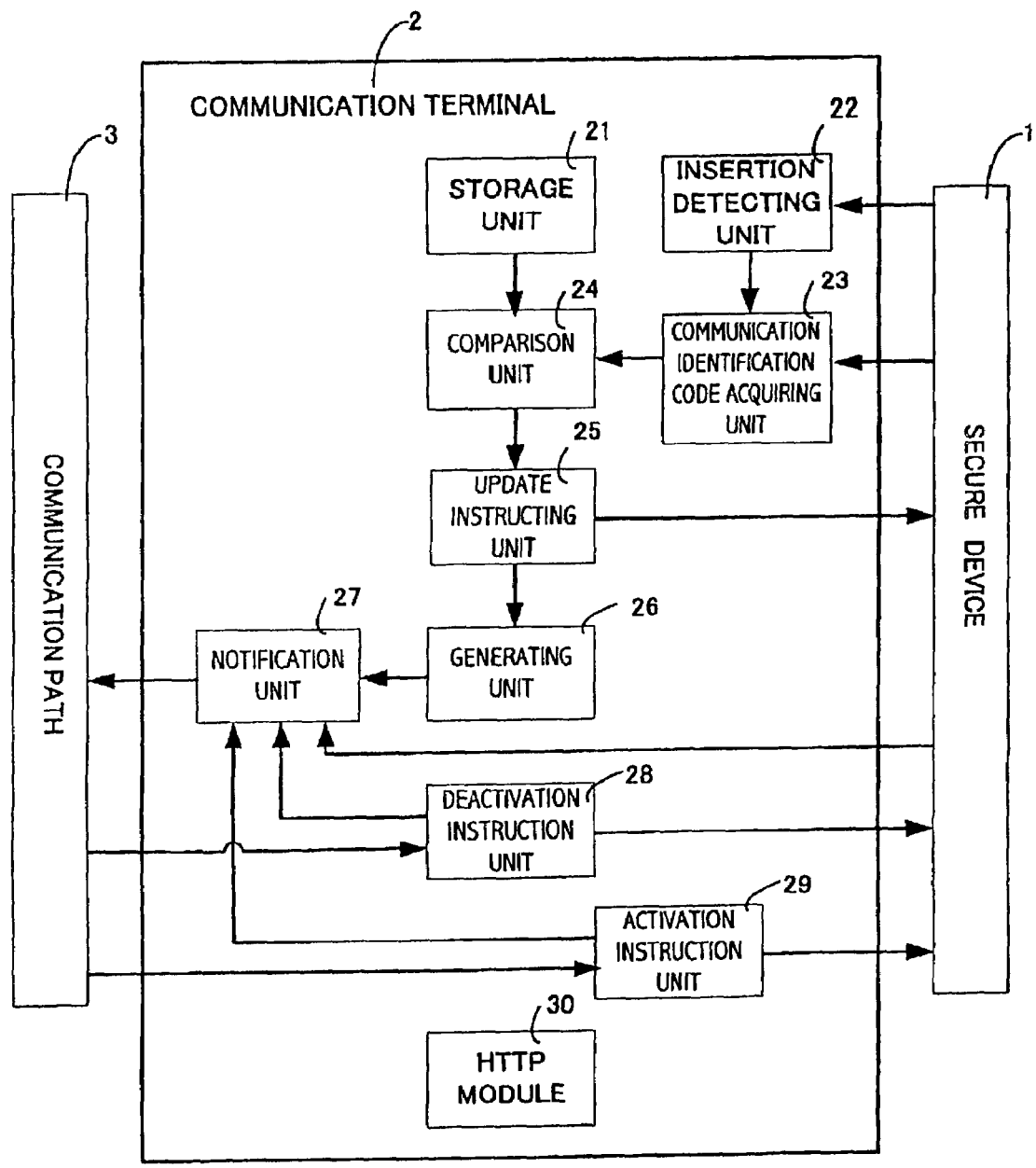
FIG. 3 shows the construction of a communication terminal 2.

FIG. 3 shows the construction of the communication terminal 2.

As shown in FIG. 3, the communication terminal 2 includes a storage unit 21, an insertion detecting unit 22, a communication identification code acquiring unit 23, a comparison unit 24, an update instructing unit 25, a generating unit 26, a notification unit 27, a deactivation instruction unit 28, an activation instruction unit 29, and a HTTP module 30.

The storage unit 21 stores a communication identification code assigned to the communication terminal 2. In the present embodiment, it is presumed that the storage unit 21 stores electronic mail address "MLADR" as the communication identification code of the communication terminal 2.

The insertion detecting unit 22 detects that a secure device has been inserted into the communication terminal 2.

The communication identification code acquiring unit 23, after the insertion detecting unit 22 detects an insertion of a secure device, acquires a communication identification code of a communication terminal into which the inserted secure device was inserted most recently, from the inserted secure device. It is presumed here that the secure device 1 is inserted into the communication terminal 2, and that the communication identification code acquiring unit 23 acquires electronic mail address "SD_MLADR" as the communication identification code.

The comparison unit 24 compares the communication identification code acquired by the communication identification code acquiring unit 23 ("SD_MLADR" in this example) with the communication identification code stored in the storage unit 21 ("MLADR" in this example), and judges whether they match each other.

The update instructing unit 25, if the comparison unit 24 judges that the two communication identification codes do not match, outputs, to the secure device 1 being inserted, an update instruction to update the communication identification code stored in the storage unit 21 ("MLADR" in this example) to the communication identification code of the communication terminal into which the secure device was inserted most recently, so that the secure device 1 updates the stored data.

The generating unit 26 generates the deactivation authentication key and the activation authentication key. It is presumed here that the generating unit 26 generates "DKEY" as the deactivation authentication key, and "AKEY" as the activation authentication key.

Each of the deactivation authentication key and the activation authentication key is, for example, a 56-bit binary random number.

The notification unit 27, if the secure device 1 has updated the stored data in accordance with an instruction by the update instructing unit 25, reads the management center 8 communication identification code "CMLADR" and the secure device 1 identification number "SDID" from the storage unit 11, and transmits an electronic mail to electronic mail address "CMLADR" which is the read management center 8 communication identification code. The electronic mail contains the read identification number "SDID", communication identification code "MLADR" stored in the storage unit 21, and the deactivation authentication key and the activation authentication key generated by the generating unit 26. With this transmission of the electronic mail, the secure device 1 is registered with the management center 8, and the deactivation authentication key "DKEY" and the activation authentication key "AKEY" are stored in the secure device 1 being inserted into the communication terminal 2.

It should be noted here that in the present embodiment, the electronic mail transmitted from the notification unit 27 conforms to the Internet technology standard RFC822 "Standard for ARPA Internet Text Message Format", and that the binary data "DKEY" and "AKEY" are embedded into the substantial data of the electronic mail after being converted into printable character sequences conforming to another Internet technology standard, RFC1521 (MIME standard).

In the present embodiment, when the last time the secure device 1 was inserted into a communication terminal, it was also into the communication terminal 2, the notification unit 27 does not transmit an electronic mail with an update instruction. However, regardless of whether the currently inserted secure device was also inserted into the communication terminal 2 the last time, the notification unit 27 may transmit an electronic mail containing an update instruction every time a secure device is inserted into the communication terminal 2, or every time the communication terminal 2 is turned ON, or at intervals of a certain time period, or every time the user uses the secure device. In such cases, there is no need to store communication identification codes of communication terminals into which the secure device was inserted in the past, and the management center updates the electronic mail containing the update instruction if any change is made to the electronic mail.

The deactivation instruction unit 28, when the management center 8 has transmitted an electronic mail instructing to deactivate a secure device, with the secure device identification number "SDID" and the deactivation authentication key "DKEY", to the electronic mail address "MLADR" of the communication terminal 2, requests the currently inserted secure device to send its identification number and receives the sent identification number, and compares the received identification number with the identification number contained in the electronic mail. If they match, unit 28 requests the currently inserted secure device to generate a random number and receives the generated random number R1, encrypts the random number R1 by the DES algorithm using the deactivation authentication key "DKEY" to generate a ciphertext C1, and sends the ciphertext C1 to the currently inserted secure device as a deactivation instruction.

Upon receiving the ciphertext C1 as a deactivation instruction, the deactivation unit 17 decrypts the ciphertext C1 by the DES algorithm using the deactivation authentication key stored in the storage unit 11, compares the decryption result D1 with the random number R1 generated by the random number generating unit 13, and if they match, authenticates the deactivation instruction successfully.

The activation instruction unit 29, when the management center 8 has transmitted an electronic mail instructing to activate a secure device, with the secure device identification number "SDID" and the activation authentication key "AKEY", to the electronic mail address "MLADR" of the communication terminal 2, requests the currently inserted secure device to send its identification number and receives the sent identification number, compares the received identification number with the identification number contained in the electronic mail, and if they match, requests the currently inserted secure device to generate a random number and receives the generated random number R2, encrypts the random number R2 by the DES algorithm using the activation authentication key "AKEY" to generate a ciphertext C2, and sends the ciphertext C2 to the currently inserted secure device as an activation instruction.

Upon receiving the ciphertext C2 as an activation instruction, the activation unit 18 decrypts the ciphertext C2 by the DES algorithm using the activation authentication key stored in the storage unit 11, compares the decryption result D2 with the random number R2 generated by the random number generating unit 13, and if they match, authenticates the activation instruction successfully.

The notification unit 27, upon receiving from the secure device 1 a signal indicating that a deactivation succeeded, transmits to the management center 8 an electronic mail indicating that a deactivation succeeded. Upon receiving from the secure device 1 a signal indicating that an activation succeeded, the notification unit 27 transmits to the management center 8 an electronic mail indicating that an activation succeeded. Upon receiving from the secure device 1 a signal indicating that a deactivation failed or upon receiving from the deactivation instruction unit 28 a comparison result that the two identification numbers do not match, the notification unit 27 transmits to the management center 8 an electronic mail indicating that a deactivation failed. Upon receiving from the secure device 1 a signal indicating that an activation failed or upon receiving from the activation instruction unit 29 a comparison result that the two identification numbers do not match, the notification unit 27 transmits to the management center 8 an electronic mail indicating that an activation failed.

The HTTP module 30 receives product information, which is, for example, provided by the EC site 7 in conformance with a communication protocol such as HTTP, and transmits order information.

Figure 4:
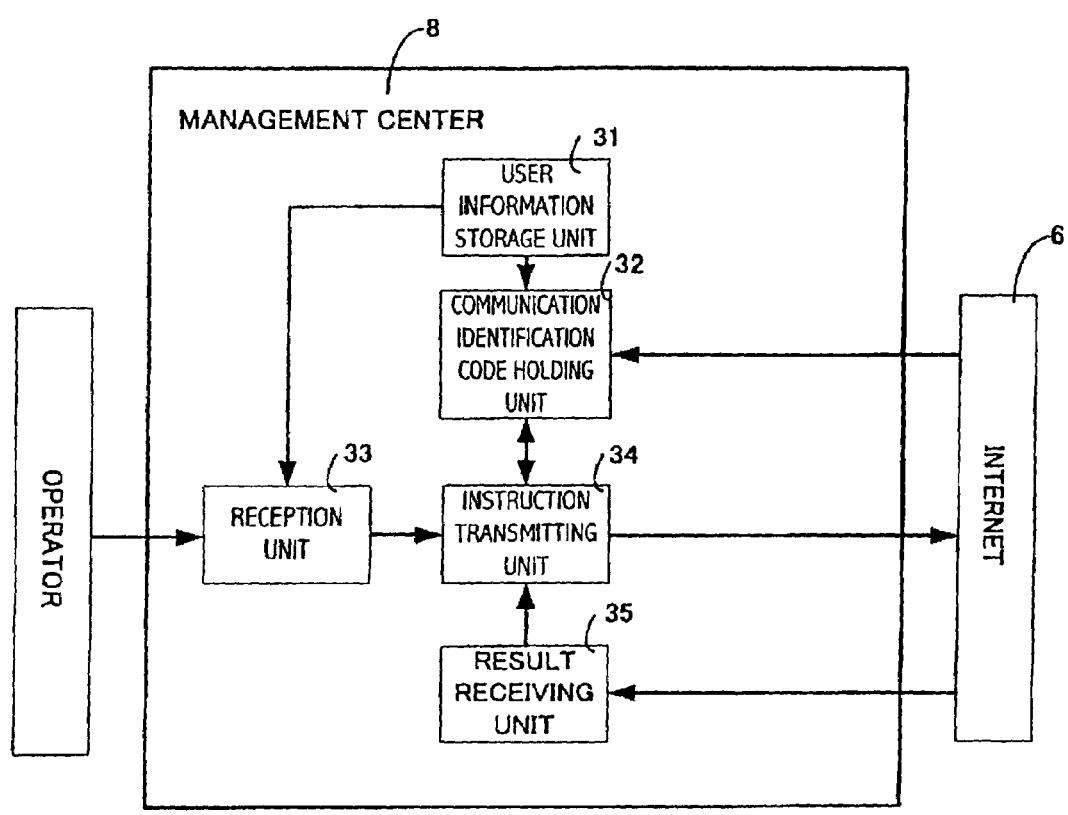
FIG. 4 shows the construction of a management center 8.

FIG. 4 shows the construction of the management center 8.

As shown in FIG. 4, the management center 8 includes a user information storage unit 31, a communication identification code holding unit 32, a reception unit 33, an instruction transmitting unit 34, and a result receiving unit 35.

The user information storage unit 31 stores user information (for example, address, name, age, birth date, contact point telephone number, and password) by corresponding it with the identification number of the secure device. For example, when the user buys the secure device 1, the user information and the identification number "SDID" of the secure device 1 are notified to the management center 8 directly or indirectly via, for example, an outlet store selling the secure device on commission and stored into the user information storage unit 31.

The communication identification code holding unit 32 receives from a communication terminal an electronic mail containing a secure device identification number, a communication identification code of a communication terminal, deactivation authentication key, and an activation authentication key, and stores, for each secure device identification number, these pieces of information by correlating them with each other.

Here, the communication identification code holding unit 32 may store only latest information, or may store all information in the past as history information, together with transmission date/time or the like of each piece of information.

The reception unit 33 receives an identification number of a secure device requested to be deactivated or activated from an authentic owner of the right to use the secure device.

For example, when the user recognizes that the user has lost the secure device 1, the user promptly requests the management center 8 to deactivate the secure device 1, notifying the management center's operator of the user's name or the like.

Upon receiving the deactivation request, the operator of the management center 8 searches the user information storage unit 31 for related data using the user's name as a key, confirms based on the address, telephone number and the like that the requester is the authentic owner of the right to use the secure device, and inputs the identification number "SDID" of the secure device 1, which has been stored in correspondence with the key data, as the identification number of the secure device to be deactivated.

Also, for example, when the user finds the secure device 1 after deactivating it thinking that he/she lost it, the user requests the management center 8 to activate the secure device 1, notifying the management center's operator of the user's name or the like.

Upon receiving the activation request, the operator of the management center 8 searches the user information storage unit 31 for related data using the user's name as a key, confirms based on the address, telephone number and the like that the requester is the authentic owner of the right to use the secure device, and inputs the identification number "SDID" of the secure device 1, which has been stored in correspondence with the key data, as the identification number of the secure device to be activated.

The instruction transmitting unit 34, in the case of deactivation, extracts, based on the identification number received by the reception unit 33, a communication identification code and a deactivation authentication key, and transmits an electronic mail, which instructs to deactivate and contains the identification number and the deactivation authentication key, to a communication terminal identified by the extracted communication identification code. In the case of activation, the instruction transmitting unit 34 extracts, based on the identification number received by the reception unit 33, a communication identification code and an activation authentication key, and transmits an electronic mail, which instructs to activate and contains the identification number and the activation authentication key, to a communication terminal identified by the extracted communication identification code.

The result receiving unit 35 receives from the communication terminal 2 an electronic mail indicating a success or failure of a deactivation or activation, and notifies the instruction transmitting unit 34 of the received result, causing the communication identification code holding unit 32 to store the result.

Here, after receiving the deactivation/activation result, the communication identification code holding unit 32 stores the received result information by attaching an execution date/time, a serial number or the like to it to clarify the order in a time series.

Operation

Operation in Setting or Updating Communication Identification Code, Etc.

Figure 5:
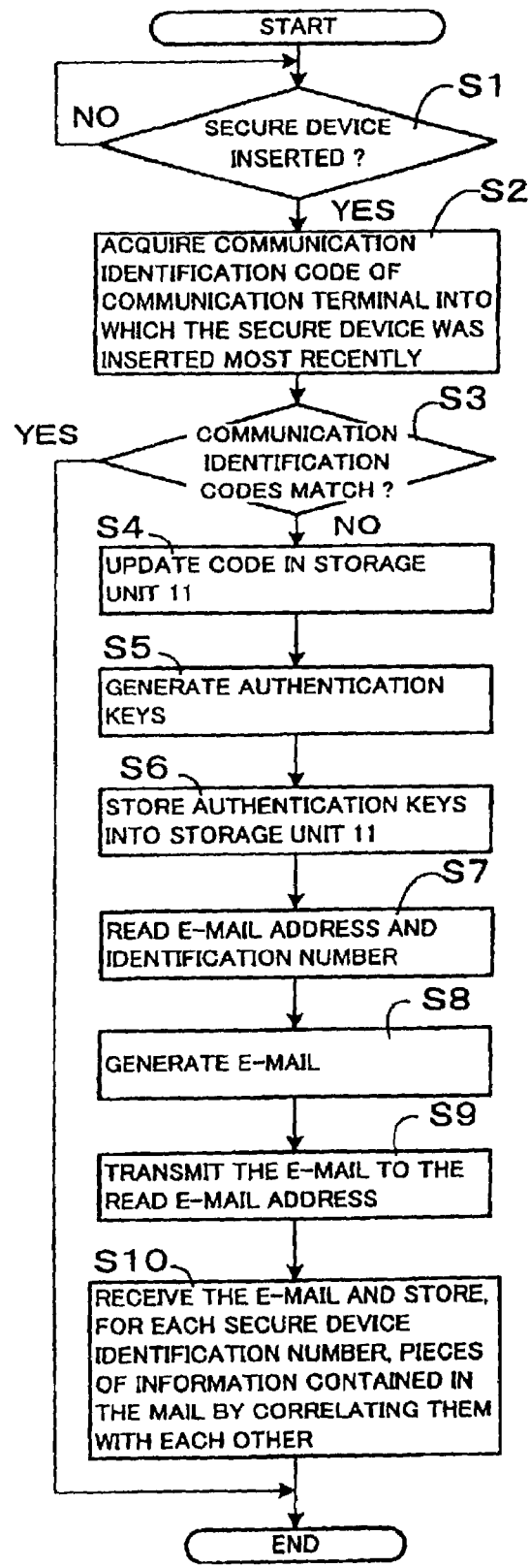
FIG. 5 shows procedures of setting or updating a communication identification code or the like with the deactivation system of the present embodiment.

FIG. 5 shows procedures of setting or updating a communication identification code or the like by the deactivation system in the present embodiment.

The following describes the procedures of setting or updating a communication identification code or the like.

(1) The insertion detecting unit 22 detects that a secure device has been inserted into the communication terminal 2 (step S1).

(2) The communication identification code acquiring unit 23 acquires a communication identification code of a communication terminal into which the inserted secure device was inserted most recently from the inserted secure device (step S2). It is presumed here that the secure device 1 is inserted into the communication terminal 2, and that the communication identification code acquiring unit 23 acquires electronic mail address "SD_MLADR" as the communication identification code.

(3) The comparison unit 24 compares the communication identification code acquired by the communication identification code acquiring unit 23 with the communication identification code stored in the storage unit 21, and judges whether they match each other (step S3). If the comparison unit 24 judges that they match, the present process ends.

(4) If the comparison unit 24 judges that the two communication identification codes do not match, the update instructing unit 25 outputs, to the secure device 1 being inserted, an update instruction to update the communication identification code stored in the storage unit 21 to the communication identification code of the communication terminal into which the secure device was inserted most recently, so that the storage unit 11 updates the stored data (step S4).

(5) The generating unit 26 generates the deactivation authentication key and the activation authentication key (step S5).

(6) The deactivation authentication key and the activation authentication key generated in the step S5 are stored in the storage unit 11 (step S6).

(7) The notification unit 27 reads electronic mail address "CMLADR" and identification number "SDID" from the storage unit 11 (step S7).

(8) The notification unit 27 generates an electronic mail that contains the read identification number "SDID", a communication identification code stored in the storage unit 21, and the deactivation authentication key and the activation authentication key generated by the generating unit 26 (step S8).

(9) The electronic mail generated in the step S8 is transmitted to the electronic mail address "CMLADR" read in the step S7 (step S9).

(10) The communication identification code holding unit 32 receives the electronic mail transmitted in the step S8, and stores, for each secure device identification number, the pieces of information contained in the received electronic mail by correlating them with each other. This allows the secure device 1 to be registered (step S10).

Deactivation Operation

Figure 6:
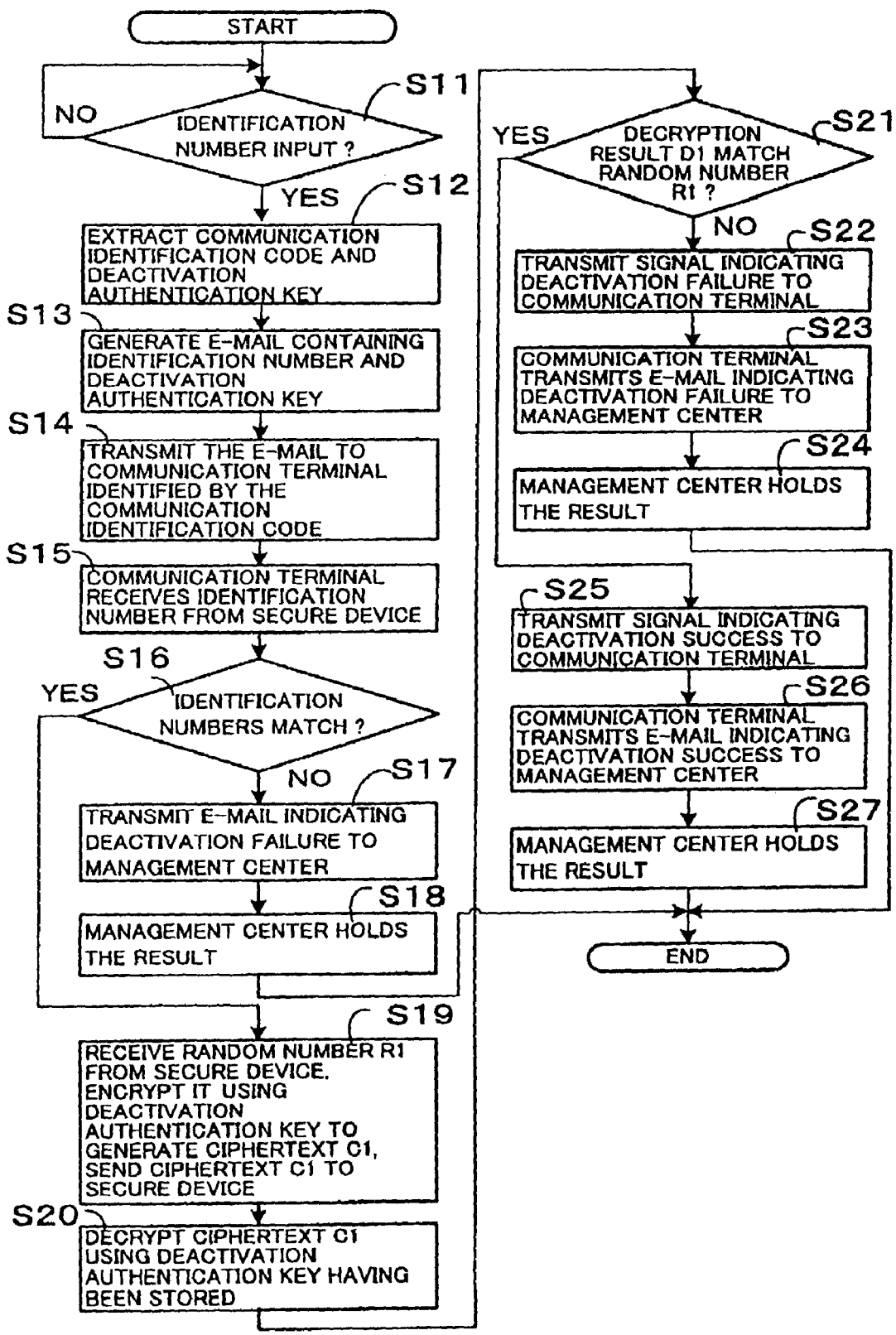
FIG. 6 shows procedures of a deactivation operation performed by the deactivation system in the present embodiment.

FIG. 6 shows procedures of deactivation operation performed by the deactivation system in the present embodiment.

The following describes the procedures of deactivation operation.

(1) The reception unit 33 receives an identification number of a secure device requested to be deactivated (step S11). It is presumed here that the reception unit 33 receives an identification number of the secure device 1.

(2) The instruction transmitting unit 34 extracts, based on the identification number received by the reception unit 33, a communication identification code and a deactivation authentication key (step S12).

(3) The instruction transmitting unit 34 generates an electronic mail that contains the identification number received by the reception unit 33 and the extracted deactivation authentication key (step S13).

(4) The instruction transmitting unit 34 transmits the generated electronic mail to a communication terminal identified by the extracted communication identification code (step S14).

(5) The deactivation instruction unit 28 receives the electronic mail transmitted in the step S14 and requests the currently inserted secure device to send its identification number and receives the sent identification number (step S15).

(6) The deactivation instruction unit 28 judges whether the identification number received from the secure device matches the identification number contained in the electronic mail (step S16).

(7) If the two identification numbers do not match, the notification unit 27 transmits to the management center 8 an electronic mail indicating that a deactivation failed (step S17).

(8) Upon receiving the electronic mail indicating that a deactivation failed, the result receiving unit 35 notifies the instruction transmitting unit 34 of the received result, causing the communication identification code holding unit 32 to store the result (step S18).

(9) If it is judged that the two identification numbers match in the step S16, the deactivation instruction unit 28 requests the currently inserted secure device to generate a random number and receives the generated random number R1, encrypts the random number R1 using the deactivation authentication key to generate a ciphertext C1, and sends the ciphertext C1 to the currently inserted secure device as a deactivation instruction (step 119)

(10) Upon receiving the ciphertext C1 as a deactivation instruction, the deactivation unit 17 decrypts the ciphertext C1 using the deactivation authentication key stored in the storage unit 11 (step S20).

(11) The deactivation unit 17 compares the decryption result D1 with the random number R1 generated by the random number generating unit 13 (step S21).

(12) If it is judged in the step S21 that the decryption result D1 does not match the random number R1, the deactivation unit 17 judges that the deactivation instruction is not authentic and transmits to the communication terminal 2 a signal indicating that a deactivation failed (step S22).

(13) After the communication terminal 2 receives the signal indicating that a deactivation failed, the notification unit 27 transmits to the management center 8 an electronic mail indicating that a deactivation failed (step S23).

(14) Upon receiving the electronic mail indicating that a deactivation failed, the result receiving unit 35 notifies the instruction transmitting unit 34 of the received result, causing the communication identification code holding unit 32 to store the result (step S24).

(15) If it is judged in the step S21 that the decryption result D1 matches the random number R1, the deactivation unit 17 judges that the deactivation instruction is authentic, deactivates the secure device 1, and transmits to the communication terminal 2 a signal indicating that deactivation succeeded (step S25).

(16) After the communication terminal 2 receives the signal indicating that deactivation succeeded, the notification unit 27 transmits to the management center 8 an electronic mail indicating that deactivation succeeded (step S26).

(17) Upon receiving the electronic mail indicating that deactivation succeeded, the result receiving unit 35 notifies the instruction transmitting unit 34 of the received result, causing the communication identification code holding unit 32 to store the result (step S27).

Activation Operation

Figure 7:
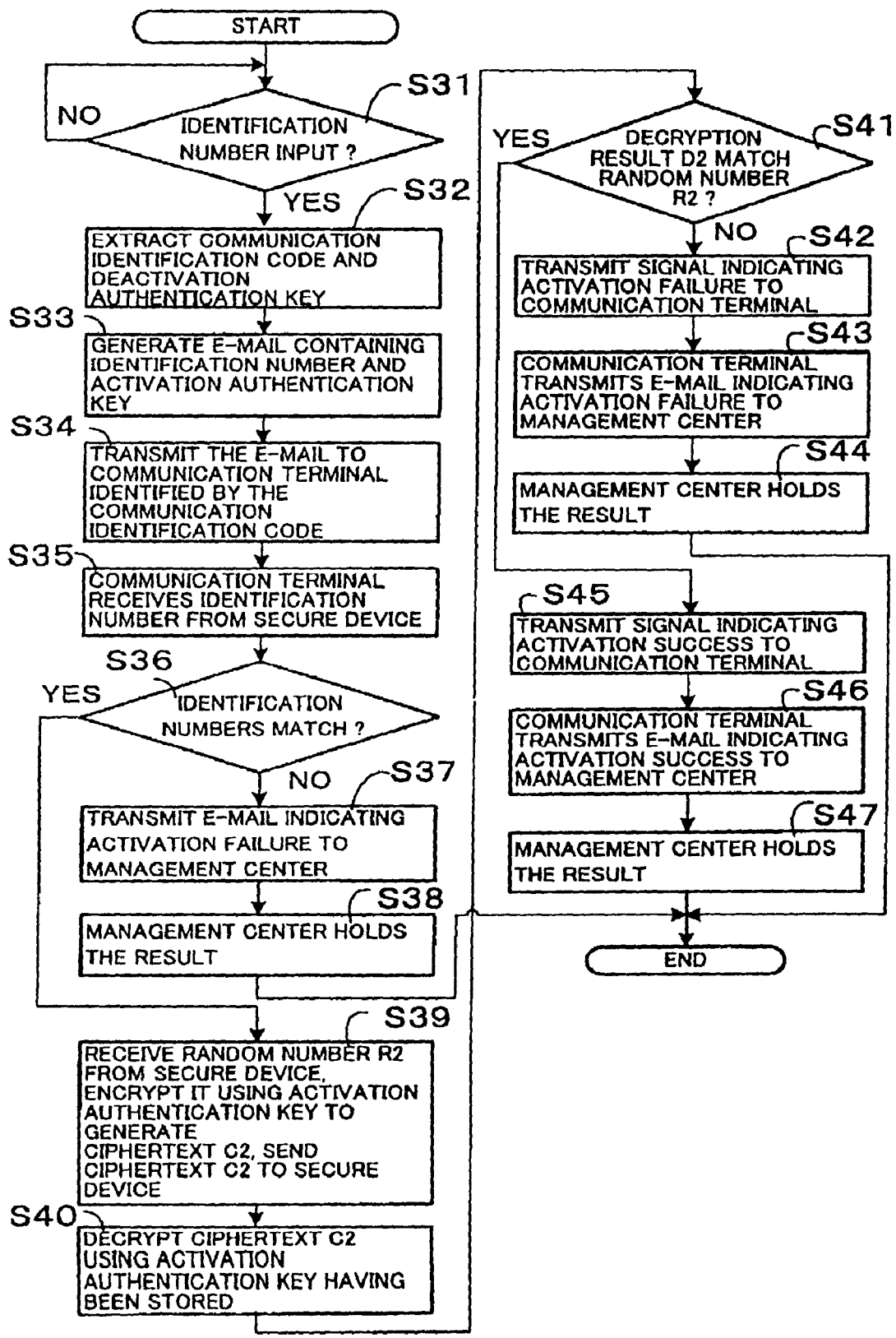
FIG. 7 shows procedures of an activation operation performed by the deactivation system in the present embodiment.

FIG. 7 shows procedures of activation operation performed by the deactivation system in the present embodiment.

The following describes the procedures of activation operation.

(1) The reception unit 33 receives an identification number of a secure device requested to be activated (step S31). It is presumed here that the reception unit 33 receives an identification number of the secure device 1.

(2) The instruction transmitting unit 34 extracts, based on the identification number received by the reception unit 33, a communication identification code and an activation authentication key (step S32).

(3) The instruction transmitting unit 34 generates an electronic mail that contains the identification number received by the reception unit 33, and the extracted activation authentication key (step S33).

(4) The instruction transmitting unit 34 transmits the generated electronic mail to a communication terminal identified by the extracted communication identification code (step S34).

(5) The activation instruction unit 29 receives the electronic mail transmitted in the step S34 and requests the currently inserted secure device to send its identification number and receives the sent identification number (step S35).

(6) The activation instruction unit 29 judges whether the identification number received from the secure device matches the identification number contained in the electronic mail (step S36).

(7) If the two identification numbers do not match, the notification unit 27 transmits to the management center 8 an electronic mail indicating that an activation failed (step S37)

(8) Upon receiving the electronic mail indicating that an activation failed, the result receiving unit 35 notifies the instruction transmitting unit 34 of the received result, causing the communication identification code holding unit 32 to store the result (step S38).

(9) If it is judged that the two identification numbers match in the step S36, the activation instruction unit 29 requests the currently inserted secure device to generate a random number and receives the generated random number R2, encrypts the random number R2 using the activation authentication key to generate a ciphertext C2, and sends the ciphertext C2 to the currently inserted secure device as an activation instruction (step S39).

(10) Upon receiving the ciphertext C2 as an activation instruction, the activation unit 18 decrypts the ciphertext C2 using the activation authentication key stored in the storage unit 11 (step S40).

(11) The activation unit 18 compares the decryption result D2 with the random number R2 generated by the random number generating unit 13 (step S41).

(12) If it is judged in the step S41 that the decryption result D2 does not match the random number R2, the activation unit 18 judges that the activation instruction is not authentic and transmits to the communication terminal 2 a signal indicating that an activation failed (step S42).

(13) After the communication terminal 2 receives the signal indicating that an activation failed, the notification unit 27 transmits to the management center 8 an electronic mail indicating that an activation failed (step S43).

(14) Upon receiving the electronic mail indicating that an activation failed, the result receiving unit 35 notifies the instruction transmitting unit 34 of the received result, causing the communication identification code holding unit 32 to store the result (step S44).

(15) If it is judged in the step S41 that the decryption result D2 matches the random number R2, the activation unit 18 judges that the activation instruction is authentic, activates the secure device 1, and transmits to the communication terminal 2 a signal indicating that an activation succeeded (step S45).

(16) After the communication terminal 2 receives the signal indicating that an activation succeeded, the notification unit 27 transmits to the management center 8 an electronic mail indicating that an activation succeeded (step S46).

(17) Upon receiving the electronic mail indicating that an activation succeeded, the result receiving unit 35 notifies the instruction transmitting unit 34 of the received result, causing the communication identification code holding unit 32 to store the result (step S47).

As described above, according to the present embodiment, an electronic mail address of a communication terminal into which a secure device is inserted is notified to and held by the management center, and an electronic mail instructing to deactivate the secure device is transmitted to an electronic mail address held by the management center. With this construction, it is possible to use a secure device for a variety of purposes by inserting the-secure device into one of the communication terminals that are respectively suitable for the variety of purposes, and to deactivate the secure device regardless of the communication terminal into which the secure device is inserted.

In the present embodiment, a secure device requested to be deactivated is not deactivated if the identification number contained in the electronic mail as the deactivation target does not match "SDTD" read from the secure device. With this construction, there is a fear that a malicious third party may carry out what is called man-in-the-middle attack to manipulate data at somewhere between the communication terminal and the secure device, and may manage to elude the deactivation by tampering with the SDID. To prevent such an unauthorized operation, authentication data such as a digital signature is attached to the SDID read from the secure device; the communication terminal authenticates the SDID data using the authentication data; and if it is confirmed that the SDID data is not authentic, the secure device is prohibited from being used.

Also, to prevent an unauthorized operation in which an electronic mail instructing deactivation/activation is recorded into a certain recording medium and used by a third party in the middle of the transmission of the electronic mail, the deactivation authentication key or the activation authentication key may be updated by the method shown in FIG. 5 after a deactivation or activation is performed.

In the present-embodiment, the communication terminal generates and sends the deactivation authentication key and the activation authentication key to the management center when the communication identification code is set or updated. However, in so far as the management center and the secure device can safely share the deactivation and activation authentication keys, any apparatus may generate the deactivation and activation authentication keys anytime. For example, when a secure device is manufactured, the deactivation and activation authentication keys may be stored into the secure device, and a warranty in which the deactivation and activation authentication keys are written may be issued. Then the user may send the warranty to the management center by mail or bring it directly thereto so that the keys can be shared by the management center and the secure device.

In the present embodiment, in a deactivation or activation of a secure device, to prevent the deactivation/activation authentication key from being leaked, a challenge-response process is performed between the communication terminal and the secure device. However, any authentication process may be performed for this purpose in so far as no problem is caused in terms of the safety. For example, a password, which is an easy method, may be used in the authentication process.

In the present embodiment, electronic mails are exchanged between the management center and the communication terminal. However, to prevent a third party from disguising the management center or the communication terminal, the contents of the electronic mails may be encrypted or a digital signature including a time stamp may be put onto each electronic mail so that safety along the communication path is enhanced.

Also, recorded in a computer-readable recording medium, a program that allows a computer to operate as described in the present embodiment of the present invention may be distributed, or may be transferred directly via a network.

It should be noted here that the computer-readable recording medium may be a floppy disk, CD, MO, DVD, memory card or the like that can be attached and detached to and from a computer, or may be a nonremovable recording medium such as a hard disk, semiconductor memory or the like, and is not limited to a particular recording medium.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A secure device for use while attached to a plurality of communication terminals that are of a plurality of types of usage patterns on a one-to-one basis, said secure device being able to be used in any of the communication terminals, where each of the plurality of types of communication terminals is assigned with and stores different pieces of terminal identification information used to identify the communication terminal and each is operable to communicate with other apparatuses, via a management apparatus of the same type as the communication terminal, based on the terminal identification information assigned thereto, said secure device comprising:

- a storage unit operable to store a piece of device identification information and a history that is composed of terminal identification information of communication terminals to which said secure device itself has been attached, wherein each of a plurality of secure devices including said secure device is assigned with and stores a different piece of device identification information, used to identify said secure device itself;
- a notifying unit operable to, when said secure device itself is attached to one of the plurality of communication terminals, refer to the stored history, and only when it is found that terminal identification information of the communication terminal to which said secure device itself is attached is different from terminal identification information of the communication terminal to which said secure device itself was attached immediately before, immediately notify, via the communication terminal, said same type of management apparatus, of the piece of device identification information stored in said storage unit and terminal identification information of the communication terminal;
- a deactivation unit operable to immediately deactivate said secure device in response to a deactivation instruction being received from the communication terminal while said secure device is attached thereto after the deactivation instruction having been transmitted from said same type of management apparatus; and
- an update unit operable to, only when it is found that terminal identification information of the communication terminal to which said secure device itself is attached is different from terminal identification information of the communication terminal to which said secure device itself was attached immediately before, update the terminal identification information of the communication terminal to which said secure device itself was attached immediately before, contained in the history stored in the storage unit, to the terminal identification information of the communication terminal to which said secure device itself is attached.

2. The secure device of claim 1, wherein:

said storage unit is further operable to store an electronic mail address of a management apparatus of a type of communication terminal among the plurality of types of communication terminals;

the piece of terminal identification information of said type of communication terminal is an electronic mail address;

said notifying unit, (I) when the terminal identification information of the communication terminal to which said secure device itself was attached immediately before is not an electronic mail address, or (ii) when the terminal identification information of the communication terminal to which said secure device itself was attached immediately before is an electronic mail address, but the electronic mail address does not match an electronic mail address which is the terminal identification information of the communication terminal to which said secure device itself is attached, is operable to cause the communication terminal to which said secure device is attached to transmit an electronic mail containing the piece of terminal identification information and the electronic mail address which is the terminal identification information of the communication terminal to which said secure device itself is attached, to the electronic mail address of the management apparatus of said type of communication terminal stored in said storage unit; and said deactivation unit is operable to immediately deactivate said secure device when the deactivation instruction is received, while said secure device is attached to the communication terminal, from the communication terminal, the deactivation instruction having been sent from the communication terminal based on an electronic mail that contains the deactivation instruction and was sent to the electronic mail address of said type of communication terminal.

3. The secure device of claim 1, and further comprising:

an activation unit operable to, after said deactivation unit has deactivated said secure device, activate said secure device in response to an activation instruction being received via the communication terminal, the activation instruction being transmitted from the management apparatus, which transmitted the deactivation instruction, to the communication terminal identified by the piece of terminal identification information that was notified by said notifying unit to the management apparatus.

4. The secure device of claim 1, and further comprising:

a conditional use unit operable to enable use of said secure device offline within a predetermined limit; and a conditional change unit operable to perform an online change of the predetermined limit of said conditional use unit.

5. The secure device of claim 1, wherein said deactivation unit is operable to deactivate said secure device only after a challenge-response authentication performed with the communication terminal to which said secure device is attached has successfully terminated.

* * * * *